United States Patent
Cummings

[19]

[11] Patent Number: 5,984,645
[45] Date of Patent: Nov. 16, 1999

[54] COMPRESSOR WITH COMBINED PRESSURE SENSOR AND HIGH PRESSURE RELIEF VALVE ASSEMBLY

[75] Inventor: Larry Donald Cummings, Clarence, N.Y.

[73] Assignee: General Motors Corporation, Detroit, Mich.

[21] Appl. No.: 09/057,179

[22] Filed: Apr. 8, 1998

[51] Int. Cl.[6] .................................................. F04B 49/00
[52] U.S. Cl. .......................... 417/307; 417/306; 417/311; 417/63; 137/510; 137/540; 200/83 Q; 210/90; 251/75
[58] Field of Search ...................................... 417/307, 306, 417/311, 63; 137/510, 540; 200/83 Q; 210/90; 251/75

[56] References Cited

U.S. PATENT DOCUMENTS

| | | |
|---|---|---|
| 4,400,601 | 8/1983 | Brucken ................................ 200/81.4 |
| 4,932,841 | 6/1990 | Havemann ................................ 417/63 |
| 4,938,272 | 7/1990 | Sandy, Jr. et al. ...................... 152/427 |
| 5,153,396 | 10/1992 | Cummings ................................ 200/83 |
| 5,192,425 | 3/1993 | Cypheres et al. ......................... 210/90 |
| 5,211,372 | 5/1993 | Smith ....................................... 251/75 |
| 5,913,664 | 6/1999 | Shimizu et al. ......................... 417/307 |

*Primary Examiner*—Philip H. Leung
*Assistant Examiner*—Leonid Fastovsky
*Attorney, Agent, or Firm*—Patrick M. Griffin

[57] ABSTRACT

A combined compressor pressure sensor and excess pressure relief valve (12) uses a formed disk (22) that snaps down and back up at a pair of predetermined pressures. The disk (22), when it snaps down, opens a plug (34) to in turn allow excess pressure from the compressor (10) to escape. When up, the plug (34) remains sealed, the outside vents (42) remain blocked, and compressor gas flow only through the center of the plug (34) and disk (22) to a sensing chamber (46).

3 Claims, 4 Drawing Sheets

COMPRESSOR WITH COMBINED PRESSURE SENSOR AND HIGH PRESSURE RELIEF VALVE ASSEMBLY

TECHNICAL FIELD

This invention relates to automotive air conditioning high pressure relief valves and pressure sensors, and specifically to an assembly that combines both functions.

BACKGROUND OF THE INVENTION

Automotive air conditioning compressors typically include a pressure sensor that reads the refrigerant pressure within the compressor shell. A conventional pressure sensor would include a housing with a pressurizable volume located below a sensor element. In addition, many compressors use a passively acting pressure relief valve to vent excessive refrigerant pressure from the compressor shell. These may be frangible, one time use valves, although spring loaded, resealing valves are generally desired. Conventional, spring loaded high pressure relief valves suffer from the drawback that they tend to open and close at substantially the same pressure, and may oscillate between open and closed positions, rather than staying open long enough to smoothly and continuously vent from a higher to an incrementally lower pressure before closing. The use of separate pressure sensors and relief valves, besides the obvious cost, also creates two potential leak paths out of the compressor shell.

SUMMARY OF THE INVENTION

A combined pressure sensor and high pressure relief valve assembly in accordance with the present invention is characterised by the features specified in claim 1.

The assembly of the invention has a single housing with an inlet passage that opens at a lower end into the interior of the compressor shell and opens at the upper end below a pressure sensor element. Pressurized refrigerant gas can thereby reach the sensor element. Clamped inside the housing is a round, formed snap disk, oriented with its convex upper surface below the sensor element and its under surface covering the upper end of the inlet passage. The snap disk deforms up and down at characteristic first and second applied pressures. The disk is chosen so as to snap down at a higher pressure corresponding to the pressure at which it is desired to vent the compressor shell, and so as to snap back at an incrementally lower pressure.

Closely seated within the housing inlet passage, below the disk, is a plug, the upper end of which is fixed and sealed to the under side of the disk. Consequently, the plug can be moved up and down axially within the inlet passage by the snapping action of the disk. A central tube opens through the plug and through the center of the disk, creating an inner flow path from the compressor shell to the sensor element that is always open. A pair of axially spaced, exterior seals on the plug seats tightly against the inner surface of the inlet passage when the plug is closed, so that the only open refrigerant flow path is through the central tube and to the sensor element. The plug exterior seals both move away from the inlet passage's inner surface when the plug opens, creating an exterior flow path around the plug. Vents open through the housing from a point axially between the exterior plug seals to the outside. Therefore, when the pressure above the disk rises high enough to snap the disk down and open the plug, excess pressure from the compressor shell interior can vent to the outside. When the incrementally lower pressure is reached that allows the disk to snap back up, the plug closes, resealing the outside vent. Therefore, a pressure sensor and resealing high pressure vent valve are provided by a single valve assembly.

BRIEF DESCRIPTION OF THE DRAWINGS

These and other features of the invention will appear from the following written description, and from the drawings, in which.

DESCRIPTION OF THE PREFERRED EMBODIMENT

Figure 1:
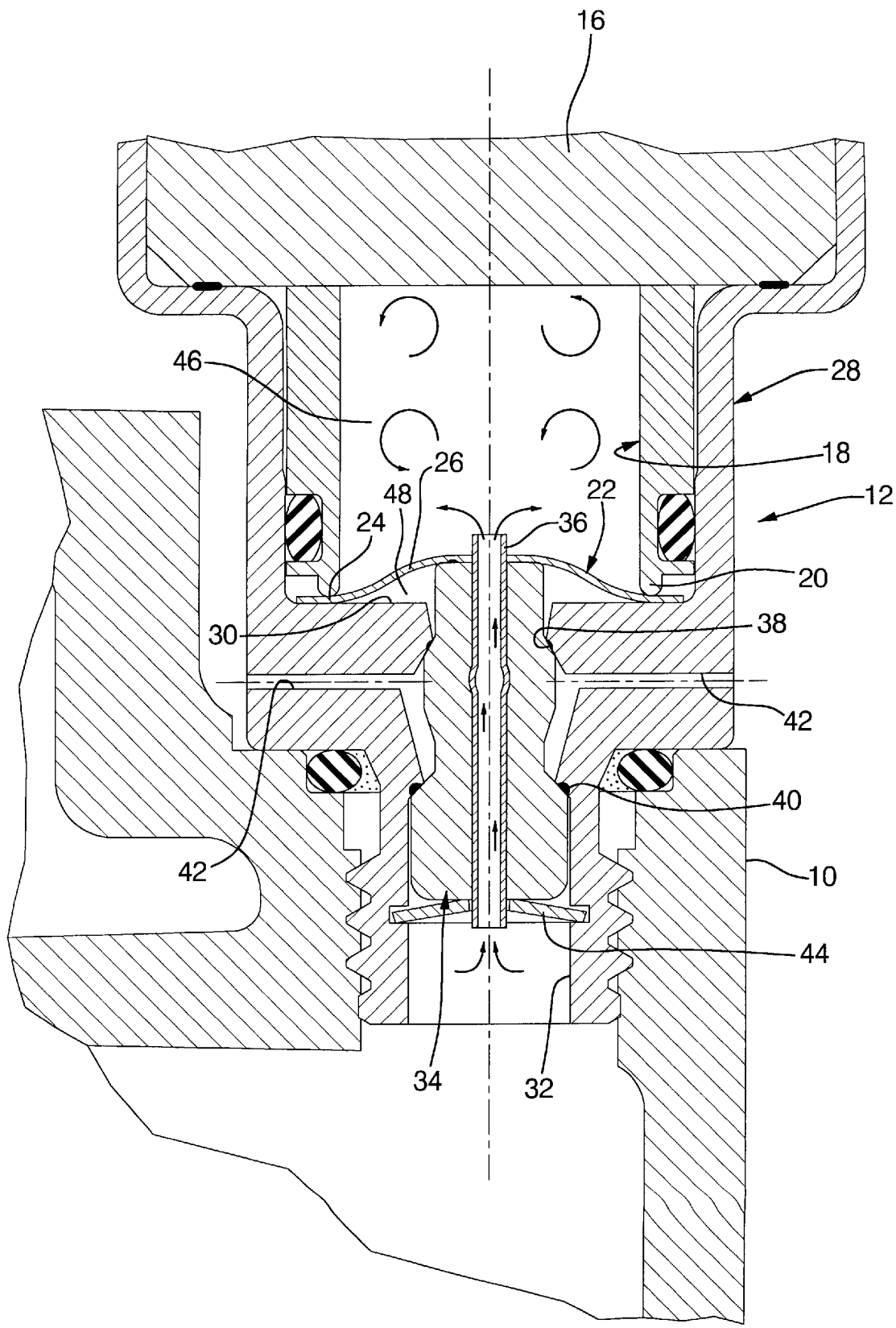
FIG. 1 is a cross section through a preferred embodiment of the invention, with the relief valve closed.

Referring first to FIG. 1, an automotive air conditioning compressor includes canister shaped, pressurized shell 10 to which a preferred embodiment of the combined pressure sensor and high pressure relief valve assembly of the invention, indicated generally at 12, is mounted. Compressor shell 10 has a normal operating pressure range of up to approximately 450 psi (pounds per square inch). A measured value of the pressure can be used for several functions, including an electrical clutch cut out that effectively turns off the compressor at a high pressure, preventing further pressure build up. Pressure is typically measured with a dedicated sensor that opens into the compressor shell 10. It is also preferred to directly vent excess pressure to atmosphere, as well as turning the compressor off. This is also typically done with a dedicated relief valve that opens independently through the compressor shell 10. This represents not only the obvious cost of two separate components, but also creates two separate potential leak paths out of the compressor shell 10. The subject invention combines both functions into a single assembly.

Figure 5:
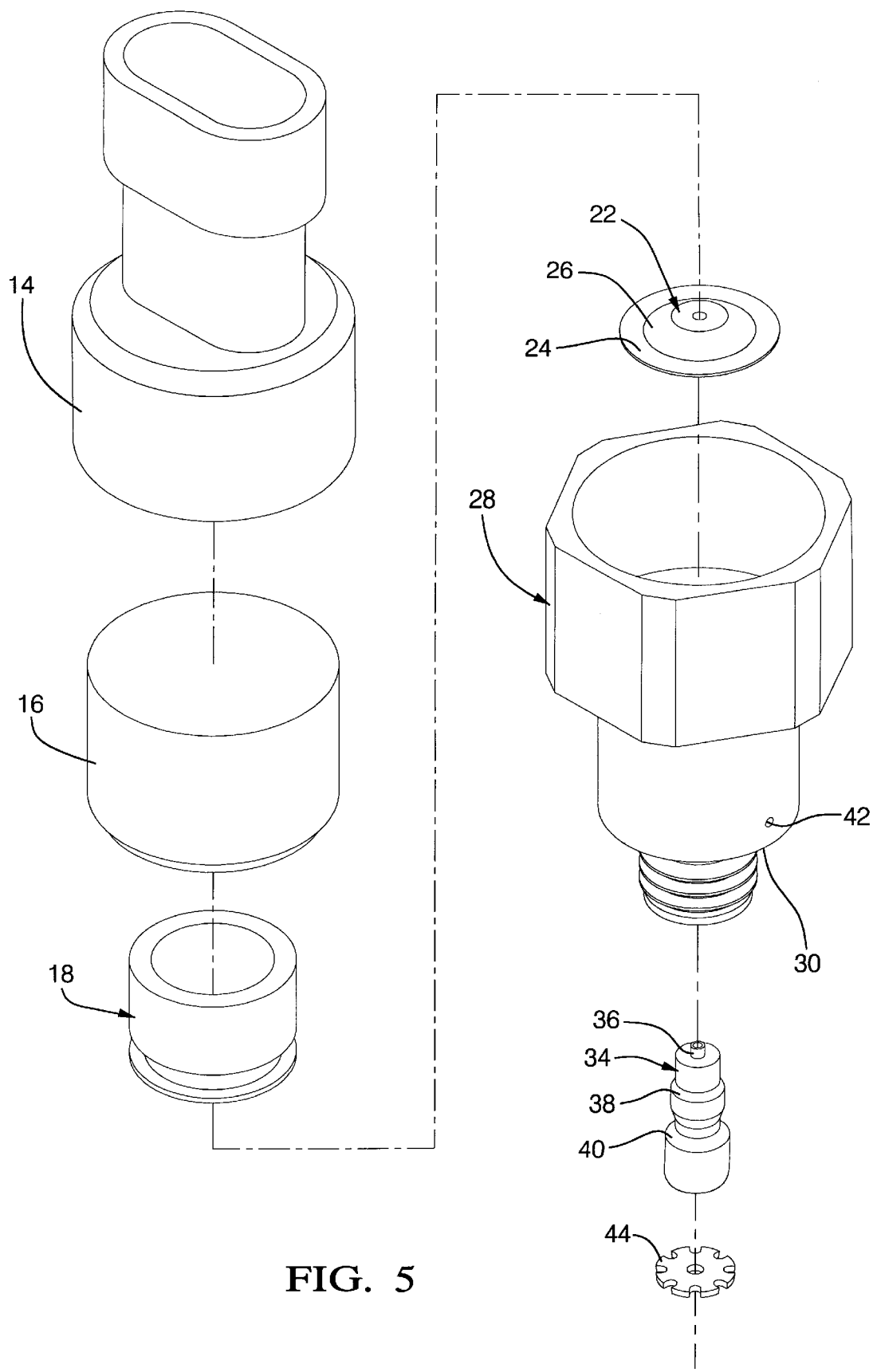
FIG. 5 is an exploded perspective view of the invention.

Referring next to FIG. 5, the separate components of the assembly 12 are illustrated. Starting at the top, a plug in electrical connector 14 sits above a pressure sensor element 16, which may be a piezo electric element or the like that produces an electrical signal in response to a gas pressure contained below. A sleeve shaped separator, indicated generally at 18, has a radially inset, rounded lower edge 20. A formed disk, indicated generally at 22, has a flat peripheral flange 24 and a central dome 26, which responds to pressure in a fashion detailed below. A sensor housing, indicated generally at 28, has generally a stepped cylindrical shape with an intermediate annular shelf 30 and a lower inlet passage 32. A plug, indicated generally at 34, has a multi diameter stepped shape with a central tube 36 running through it end to end and a pair of axially spaced, lower and upper exterior seals 38 and 40 respectively. A series of vents 42 is cut through the housing 28 and into the inlet passage 32 in a location axially between the installed location of the two plug seals 38 and 40. A dimpled retainer washer 44 with a serrated outer edge is the lowermost component in the assembly 12. More detail about the various components and their interaction is given below.

Figure 2:
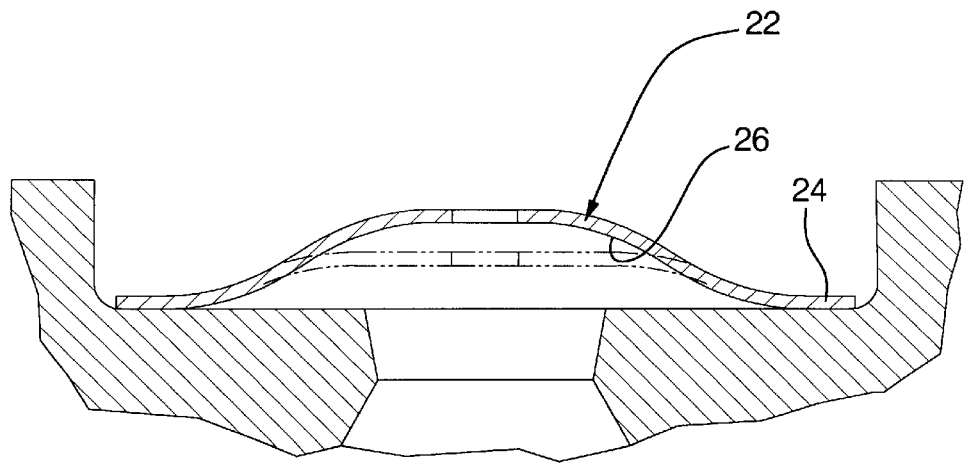
FIG. 2 is a schematic depiction of a formed snap disk in an undeformed state in solid line, and a deformed state in dotted line.
Figure 3:
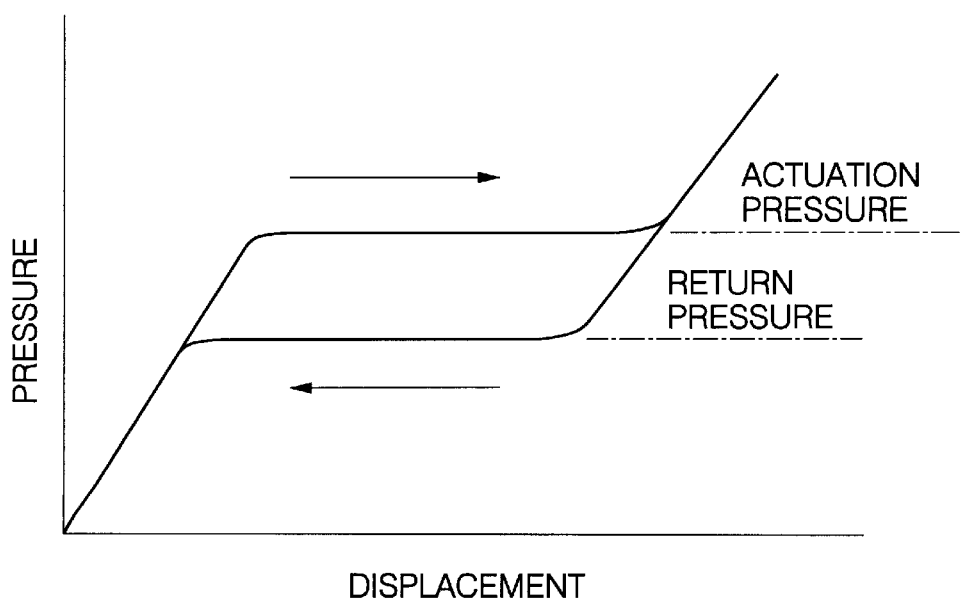
FIG. 3 is a graph showing the pressure and deformation response of a formed disk.

Referring next to FIGS. 2 and 3, the formed disk 22 is manufactured from a suitable resilient material, generally a metal such as spring steel. Disk 22 is designed to react, as the downward pressure applied to its upper surface rises, with very little downward displacement, until a predetermined threshold actuation pressure is reached. At that point, it deflects downwardly rapidly, with no increase in applied pressure, to a flattened, depressed condition, shown in dotted lines. At that point, any increase in applied pressure would create little additional downward displacement. Likewise, any initial decrease in applied pressure would cause very little upward return motion from the flattened condition. In effect, disk 22 is stable in the flattened condition, but does not stay down permanently, in the manner of an over center switch. It remains flattened only over a characteristic increment of applied pressure decrease. When a given, lower return pressure is reached, then the disk 22 rapidly returns to its undeformed condition. This characteristic pressure and deflection response is shown graphically in FIG. 3, and is sometimes referred to as "energy memory" to distinguish its response from the simple linear response of ordinary springs. For purposes of the invention, a disk 22 is chosen with a characteristic actuation pressure significantly higher than the upper range of the normal operating pressure noted above, or about 550 psi. The return pressure is chosen to be about 450 psi, within the upper end of the normal operating pressure range. Disk 22 and the other components are assembled together as described next.

Referring again to FIG. 1, the plug 34 is inserted up into the upper end of the sensor housing inlet passage 32, and the disk dome 26 is inserted over the protruding upper end of tube 36 and attached gas tight to the upper end of plug 34. The retaining washer 44 is inserted into the lower end of inlet passage 32 to retain the lower end of plug 34 in the closed, upward position. In the closed position, the two axially spaced seals 38 and 40 seat tightly against the inner surface of the inlet passage 32. The separator 18 is seated in the sensor housing 28, with its lower edge 20 resting on the thin, flat disk peripheral flange 24, which sits against the housing shelf 30. The sensor element 16 is then seated on top of the separator 18 and crimped gas tight into the housing 28. Finally, the connector 14 is attached to the top of the housing 28 to complete the assembly 12. The completed assembly 12 is threaded gas tight into the compressor shell 10. A pressurizable volume 46 is created above the disk dome 26 and below the sensor element 16 which is significantly larger in cross sectional area than the inlet passage 32 or plug 34 below. A residual space 48 is left below the disk dome 26 and above the housing shelf 30. The flat disk peripheral flange 24 is captured tightly against the flat shelf 30 by the separator's rounded lower edge 20, but not so tightly as to prevent the flange 24 from sliding under the separator edge 20 slightly when dome 26 flattens, as described below. The flange 24 is trapped closely enough to be substantially sealed against gas pressure leaking below disk 22 from the volume 46 above. Should some leakage occur, however, it is blocked from the vents 42 by the upper plug seal 38. While disk dome 26 is in the convex, undeformed condition of FIG. 1, pressurized refrigerant from inside shell 10 is blocked by lower seal 40 and can flow only through tube 36 and into the volume 46, where it can be read by sensor element 16. So long as the pressure in volume 46 remains below the actuation threshold, disk 22 remains undeformed, and plug 34 remains closed.

Figure 4:
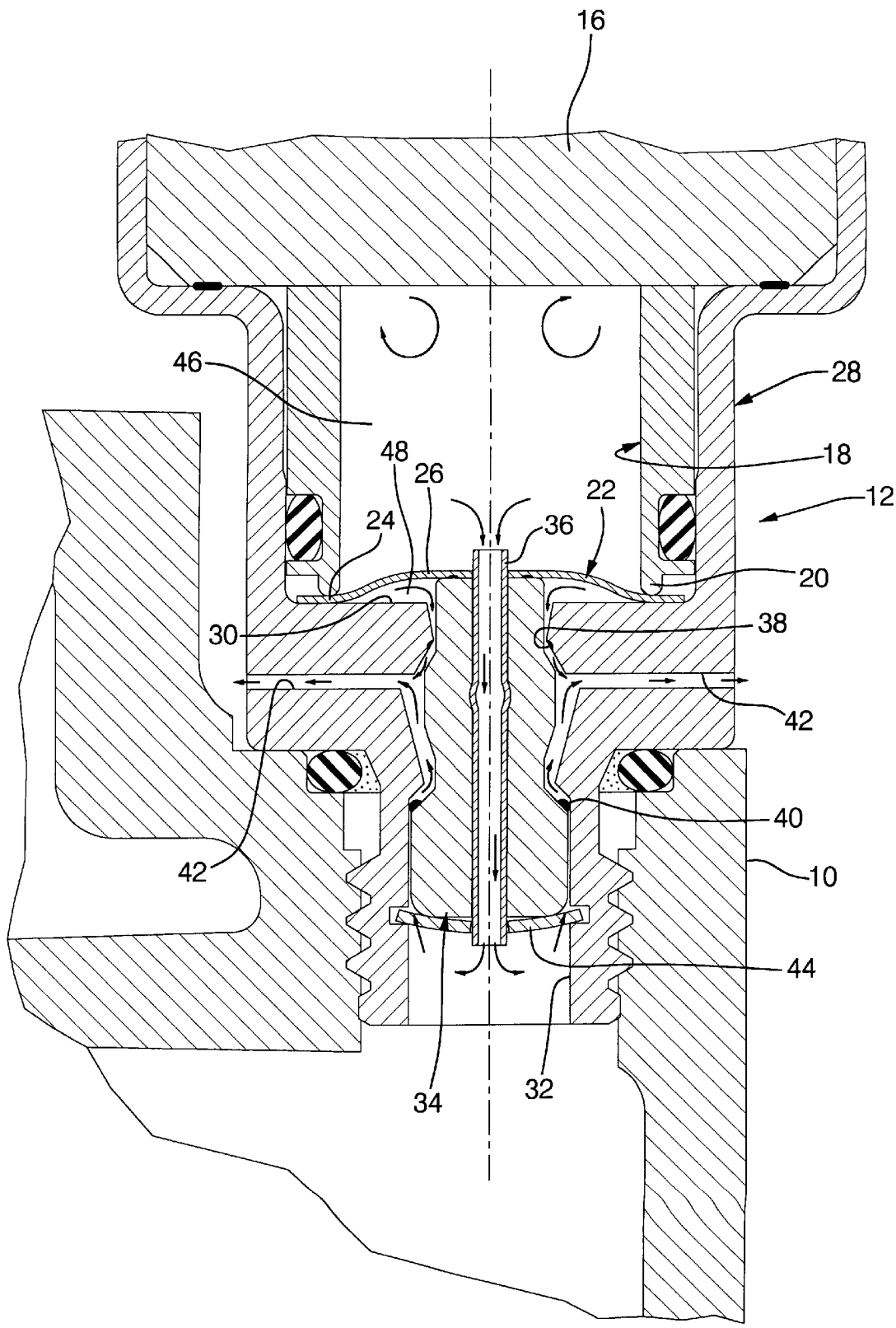
FIG. 4 is a view like FIG. 1, but showing the relief valve open.

Referring next to FIG. 4, the response of disk 22 to the pressure in volume 46 rising suddenly above the actuation threshold noted above is illustrated. Because of the close fit of flange 24 to shelf 30, even with some leakage, the pressure in residual volume 48 would not equalize quickly enough with the pressure in the volume 46 above to prevent a significant net pressure imbalance between the two. Also, because of the fact that the cross sectional area above disk 22 is significantly greater than that at the lower end of the plug 34, the net force down on disk 22 is great enough to flatten the dome 26 as shown. The peripheral flange 24 can slide under the separator lower edge 20 to the extent needed to allow it to deform downwardly, and there is enough clearance from the shelf 30 to allow free displacement, as well. As dome 26 snaps down, plug 34 concurretnly shifts down, and both seals 38 and 40 open. Now there is an open path to the vents 42 from all general directions. Specifically, from below the plug 34, gas can vent from the shell 10, through the serrated edge of the washer 44, up the inlet passage 32 an around the outside of the plug 34, past the lower seal 40 and out the vents 42 to atmosphere. From above the disk 22, gas flows through tube 36 and then through the same exit path. From below the disk 22, any gas in the residual volume 48 flows past the now open upper seal 38 and to the vents 42. The pressure in shell 10 can thereby quickly subside to the lower characteristic pressure or "return" pressure described above, without any tendency of the relief valve to stutter open and closed. Once the pressure reaches the return pressure, then the disk dome 26 can return to its original state, pulling the plug 34 closed again to reseal. The force necessary to dimple the retaining washer 44 up and down is not great enough to significantly affect the operation of the disk 22.

In conclusion, both the pressure sensing and pressure relieving functions are provided by the same, reusable and resoluble assembly. Many of the structural features disclosed above, while preferred, could be changed without altering the basic operation. The exterior seals 38 and 40 could be carried by the inner surface of the passage 32, rather than the outside of the plug 34, though it would likely be easier to apply them to the outside of the plug 34. An elastomer seal could be provided under the disk flange 24 to provide an assured gas tight seal if desired, though it is unlikely that sufficient pressure would leak past it to prevent the disk 22 from being able to deform. The upper seal 38 would not be needed for gas leakage prevention if the disk flange 24 were sealed absolutely gas tight to the shelf 30. However, it still prevents any contaminants from the outside leaking through the vents 42 and up under disk 22. The retaining washer 44 is provided simply to help hold the plug 34 closed against the unlikely possibility of a vacuum in shell 10 pulling plug 34 down. It does not have, and is not intended to have, the kind of non linear response found in disk 22. Therefore, it could potentially be replaced by an apertured plate and simple coil spring, for example. More or fewer vents 42 could be provided, the only constraint being a preference to match flow areas all along the venting path so as not to create any localized flow restrictions at any point. The central tube 36 could be replaced by a simple bore through the center of plug 34. Therefore, it will be understood that it is not intended to limit the invention to just the embodiment disclosed.

I claim:
1. For use in an automotive air conditioning compressor (10), a combined pressure sensor and high pressure relief valve assembly (12), comprising;
   a sensor housing (28) having an inlet passage (32) opening into the interior of said compressor (10) and a sensor element (16) located above said inlet passage (32),
   a formed snap disk (22) of the type that deforms downwardly at a first predetermined pressure and returns to its original shape and a second, lower predetermined pressure, said disk having a perimeter flange (24) substantially sealed within said sensor housing (28) above said inlet passage (32) and below sensor element (16), a plug (34) having an upper end sealed to the underside of said disk (22) and axially movable by said disk (22) within said inlet passage (32) from an open position to a closed position, said plug having an exterior seal (40) engageable with the surface of said inlet passage (32) in said plug closed position and a central axial opening (36) passing through said disk (22), and, at least one exterior vent (42) in said sensor housing (28) opening into said inlet passage (32) at a point above said plug exterior seal (40), whereby, when said disk (22) is undeformed and said plug (34) is closed, pressurized gas from said compressor (10) is sealed from the exterior vent (42), but can pass through said plug central axial opening (36) and above said disk (22) to be read by said sensor element (16) until the pressure above said disk (22) exceeds said first predetermined pressure, whereupon said disk (22) deforms downwardly, shifting said plug (34) to its open position and opening a path for pressurized gas to flow through said exterior vent (42) until the pressure above said disk (22) falls to said second predetermined pressure, whereupon said disk (22) returns to its undeformed state and said plug (34) moves back to its closed position and reseals.

2. A combined pressure sensor and high pressure relief valve assembly (12) according to claim 1, further characterised in that said plug (34) has a pair of exterior seals (38, 40) located above and below said exterior vent (42).

3. A combined pressure sensor and high pressure relief valve assembly (12) according to claim 1, further characterised in that said housing (28) has an annular shelf (30), with said disk perimeter flange (24) being held substantially sealed against said shelf (30) by a separator (18) trapped between said sensor element (16) and housing shelf (30).

* * * * *